United States Patent
James et al.

(10) Patent No.: US 9,840,966 B2
(45) Date of Patent: Dec. 12, 2017

(54) AUXILIARYY FLUID FLOW SYSTEM DEBRIS FILTER

(71) Applicant: UNITED TECHNOLOGIES CORPORATION, Farmington, CT (US)

(72) Inventors: Reade W. James, West Hartford, CT (US); Francis Parnin, Suffield, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 303 days.

(21) Appl. No.: 14/587,739

(22) Filed: Dec. 31, 2014

(65) Prior Publication Data

US 2015/0192068 A1    Jul. 9, 2015

Related U.S. Application Data

(60) Provisional application No. 61/923,462, filed on Jan. 3, 2014.

(51) Int. Cl.
*F02C 1/00* (2006.01)
*F02C 7/06* (2006.01)
*F01D 25/18* (2006.01)

(52) U.S. Cl.
CPC .............. *F02C 7/06* (2013.01); *F01D 25/18* (2013.01); *F05D 2260/606* (2013.01); *F05D 2260/607* (2013.01); *Y02T 50/675* (2013.01)

(58) Field of Classification Search
CPC .... F02C 7/06; F02C 7/14; F01D 25/18; F05D 2260/607; B01D 35/005; F16N 17/02; F16N 2210/02; F16N 2039/007
USPC ......................................................... 60/39.08
See application file for complete search history.

(56) References Cited

U.S. PATENT DOCUMENTS

| | | | | |
|---|---|---|---|---|
| 4,905,644 | A * | 3/1990 | Masclet | B01D 35/147 123/196 A |
| 2001/0008069 | A1* | 7/2001 | Junquera | F01D 25/18 60/484 |
| 2010/0270242 | A1* | 10/2010 | Paradise | F01D 25/18 210/741 |
| 2010/0294597 | A1* | 11/2010 | Parnin | F01D 25/18 184/6.1 |
| 2016/0032772 | A1* | 2/2016 | Sheridan | F01D 25/20 416/171 |

* cited by examiner

*Primary Examiner* — Pascal M Bui Pho
*Assistant Examiner* — Edwin Kang
(74) *Attorney, Agent, or Firm* — Cantor Colburn LLP

(57) ABSTRACT

The present disclosure relates generally to a fluid flow system having a debris filter media therein to remove debris from a fluid flowing therein. A valve is provided to periodically change the flow direction of fluid within the system so that debris trapped on the debris filter media is scrubbed off by the flow of fluid across a face of the debris filter media.

14 Claims, 3 Drawing Sheets

AUXILIARYY FLUID FLOW SYSTEM DEBRIS FILTER

CROSS REFERENCE TO RELATED APPLICATION

This application claims the benefit of and incorporates by reference herein the disclosure of U.S. Ser. No. 61/923,462, filed Jan. 3, 2014.

TECHNICAL FIELD OF THE DISCLOSURE

The present disclosure is generally related to filters and, more specifically, to an auxiliary fluid flow system debris filter.

BACKGROUND OF THE DISCLOSURE

Systems in which fluid flows often include at least one filter through which the fluid will flow. The filter removes any debris that inadvertently finds its way into the fluid. For example, a lubrication system in which a lubricant flows will typically have one lubricant filter for catching debris as it is recirculated through the lubrication system. In many applications, an auxiliary lubrication system is connected to the main lubrication system, but is capable of being isolated from the main system under certain operating conditions. Such an auxiliary lubrication system must either have its own filter (separate from the main lubrication system filter) or other accommodations for capturing debris. This increases the size, weight and cost of the system, and additionally creates the need for additional maintenance of the system since the filter will need to be cleaned and/or replaced on some predetermined schedule. Accordingly, improvements in filtering for auxiliary fluid flow systems are needed.

SUMMARY OF THE DISCLOSURE

In one embodiment, a fluid flow system is disclosed, comprising: a main fluid system passage; an auxiliary fluid supply passage; an auxiliary fluid system passage; a valve passage operatively fluidically coupling the main fluid system passage, the auxiliary fluid supply passage, and the auxiliary fluid system passage; a valve disposed in the valve passage, wherein the valve operable to be placed into: a first position in which fluid flowing in the auxiliary fluid supply passage is not permitted to flow to the main fluid system passage and is permitted to flow to the auxiliary fluid system passage; and a second position in which fluid flowing in the auxiliary fluid supply passage is permitted to flow to the main fluid system passage and is not permitted to flow to the auxiliary fluid system passage; and debris filter media disposed within the valve passage between the auxiliary fluid supply passage and the auxiliary fluid system passage.

In a further embodiment of the above, the fluid flow system comprises a lubricant system.

In a further embodiment of any of the above, the lubricant system comprises a lubricant system in a gas turbine engine.

In a further embodiment of any of the above, the fluid comprises oil.

In a further embodiment of any of the above, the valve comprises a shuttle valve.

In a further embodiment of any of the above, the valve comprises: a first valve disposed between the debris filter media and the auxiliary fluid system passage; and a second valve disposed between the auxiliary fluid supply passage and the main fluid system passage.

In a further embodiment of any of the above, the first valve and the second valve each comprise a valve selected from the group consisting of: a pressure controlled valve and a solenoid controlled valve.

In a further embodiment of any of the above, the debris filter media comprises a screen material.

In another embodiment, a gas turbine engine is disclosed, comprising: a compressor section, a combustor section, and a turbine section in serial flow communication; and a lubricant system operative to supply lubricant to at least one of the compressor section, the combustor section, and the turbine section, the lubricant system comprising: a main lubricant system passage; an auxiliary lubricant supply passage; an auxiliary lubricant system passage; a valve passage operatively fluidically coupling the main lubricant system passage, the auxiliary lubricant supply passage, and the auxiliary lubricant system passage; a valve disposed in the valve passage, wherein the valve operable to be placed into: a first position in which lubricant flowing in the auxiliary lubricant supply passage is not permitted to flow to the main lubricant system passage and is permitted to flow to the auxiliary lubricant system passage; and a second position in which lubricant flowing in the auxiliary lubricant supply passage is permitted to flow to the main lubricant system passage and is not permitted to flow to the auxiliary lubricant system passage; and debris filter media disposed within the valve passage between the auxiliary lubricant supply passage and the auxiliary lubricant system passage.

In a further embodiment of the above, the lubricant comprises oil.

In a further embodiment of any of the above, the valve comprises a shuttle valve.

In a further embodiment of any of the above, the valve comprises: a first valve disposed between the debris filter media and the auxiliary lubricant system passage; and a second valve disposed between the auxiliary lubricant supply passage and the main lubricant system passage.

In a further embodiment of any of the above, the first valve and the second valve each comprise a valve selected from the group consisting of: a pressure controlled valve and a solenoid controlled valve.

In a further embodiment of any of the above, the debris filter media comprises a screen material.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the invention, reference will now be made to certain embodiments and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Figure 1:
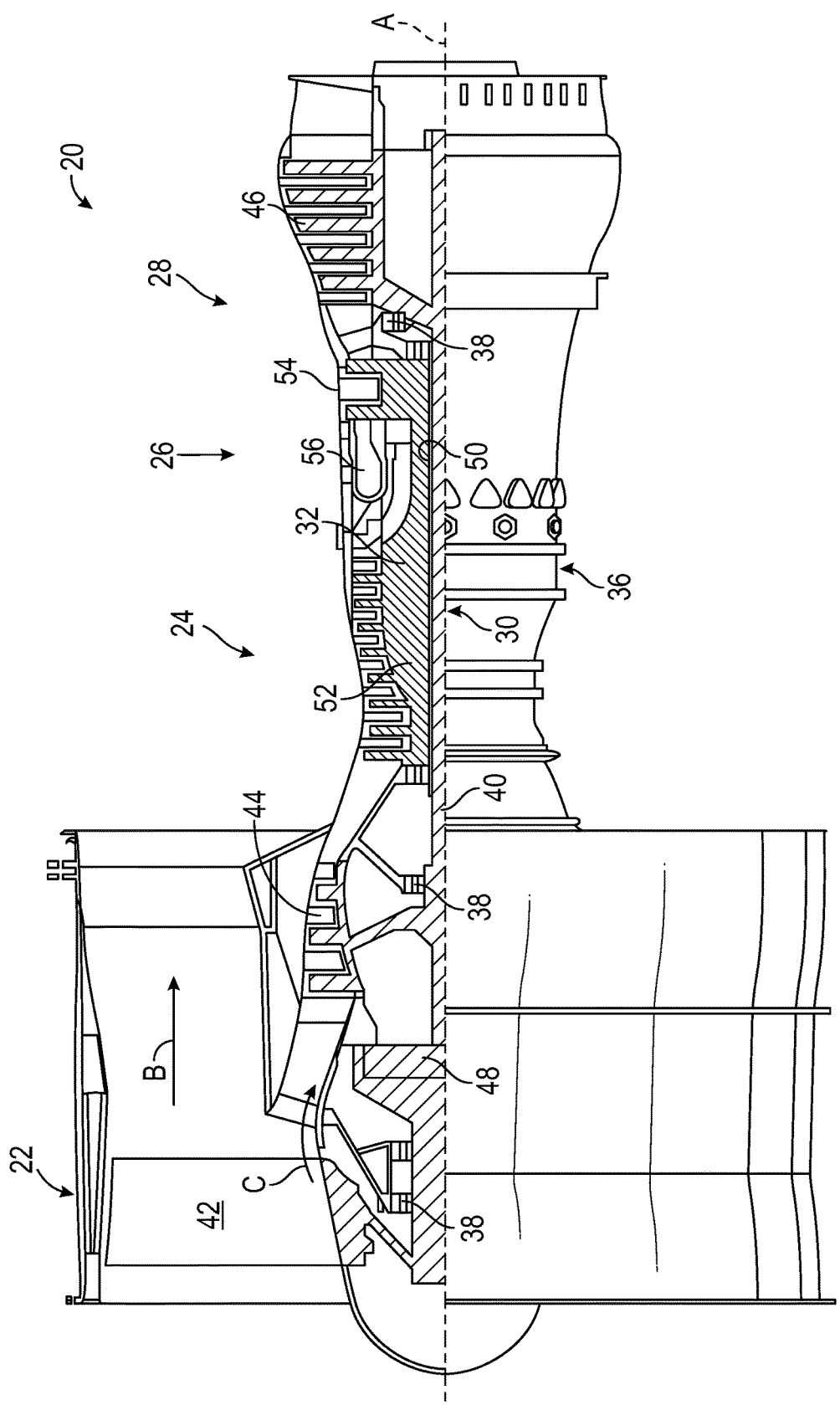
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^\circ R)/(518.7^\circ R)]^{0.5}$. The "Low corrected fan tip speed" as disclosed herein according to one non-limiting embodiment is less than about 1150 ft/second.

The present disclosure utilizes a lubrication system as an illustrative example of a fluid flow system; however, it will be appreciated that the presently disclosed embodiments are not limited to lubrication systems and will find utility in any type of fluid flow system. The present disclosure provides a screen (or other filter medium) placed inside an isolating valve that is operative to selectively isolate the auxiliary lubrication system from the main lubrication system. While the auxiliary lubrication system is isolated from the main lubrication system, the screen collects debris from the lubricant flowing therethrough. When the isolating valve shifts to integrate the auxiliary lubrication system with the main lubrication system, the flow of lubricant is across the surface of the screen. Such flow of lubricant is across the surface of the screen will clean debris from the screen and send the debris on in the main lubricant system flow for collection by the main lubricant system filter.

Figure 2:
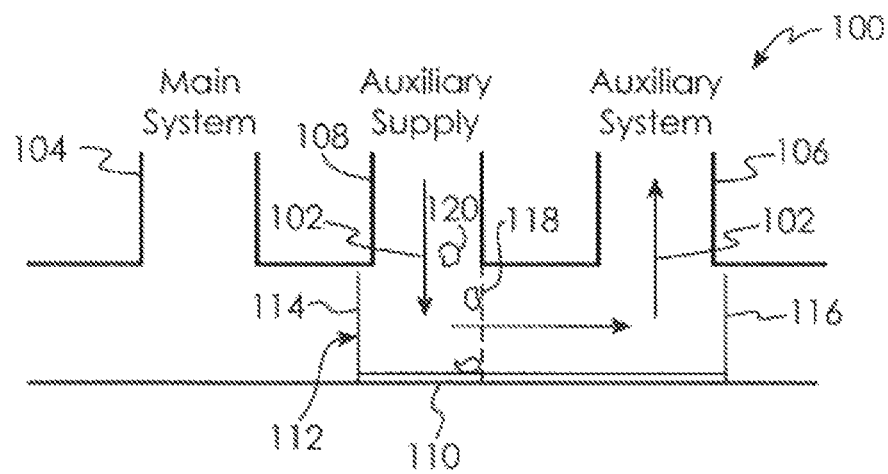
FIG. 2 is a schematic diagram of a fluid flow system in an embodiment.
Figure 3:
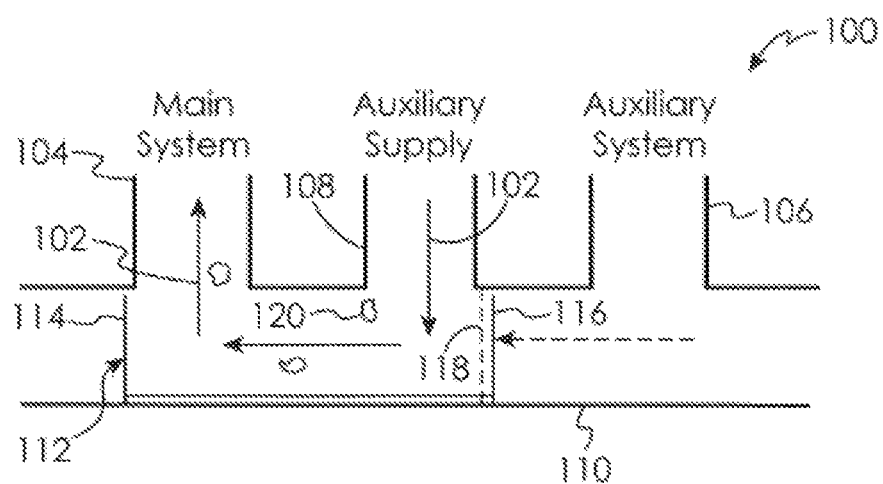
FIG. 3 is a schematic diagram of a fluid flow system in an embodiment.

A fluid flow system in one embodiment, such as a lubricant system, is schematically illustrated in FIGS. 2-3 and indicated generally at 100. In some embodiments, the lubricant system may be part of a gas turbine engine. The lubricant system 100 includes at least one passage through which a lubricant 102 flows. In some embodiments, the lubricant 102 comprises oil. The lubricant system 100 comprises a passage 104 to a main lubricant system and a passage 106 to an auxiliary lubricant system. The main lubricant system includes a main lubricant pump (not shown), while the auxiliary lubricant system receives lubricant 102 from a separate lubricant pump (not shown) through auxiliary lubricant supply passage 108. The main lubricant system includes a main lubricant system filter (not shown) operative to filter debris flowing in the main lubricant system passage 104. The main lubricant system passage 104, auxiliary lubricant system passage 106 and auxiliary lubricant supply passage 108 are fluidically operatively coupled to one another by a valve passage 110.

A valve 112 is disposed within the valve passage 110. In one embodiment, the valve 112 comprises a shuttle valve. The valve 112 includes a first wall 114 and a second wall 116, wherein each of the walls 114 and 116 engage the valve passage 110 and substantially prevent flow of lubricant therebetween. A gasket, o-ring, or other sealing mechanism (not shown) may be provided between each of the walls 114 and 116 to form a seal between the walls 114 and 116 and the valve passage 110. The valve 112 may be placed in a first position in which flow of lubricant 102 is permitted from the auxiliary lubricant supply passage 108 to the auxiliary lubricant system passage 106, and flow of lubricant 102 is not permitted from the auxiliary lubricant supply passage 108 to the main lubricant system passage 104, as shown in FIG. 2. The valve 112 may also be placed in a second position in which flow of lubricant 102 is not permitted from the auxiliary lubricant supply passage 108 to the auxiliary lubricant system passage 106, and flow of lubricant 102 is permitted from the auxiliary lubricant supply passage 108 to the main lubricant system passage 104, as shown in FIG. 3. The valve 112 may be moved between the first and second positions by means of fluid pressure (such as lubricant pressure) applied to one of the walls 114 and 116 in greater quantity than is applied to the other of the walls 114 and 116. In another embodiment, the valve 112 may be moved between the first and second positions by means of a solenoid (not shown) engaged with one of the walls 114 and 116 and a spring (not shown) engaged with the other of the walls 114 and 116.

Debris filter media 118 is positioned within the valve passage 110 between the auxiliary lubricant supply passage 108 and the auxiliary lubricant system passage 106. In one embodiment, the debris filter media 118 comprises a screen material to name just one non-limiting example. When the valve 112 is in the first position as shown in FIG. 2, lubricant 102 flowing from the auxiliary lubricant supply passage 108 to the auxiliary lubricant system passage 106 passes through the debris filter media 118, and some or all of the debris particles 120 contained in the lubricant 102 are trapped by the debris filter media 118 so that they do not flow to the auxiliary lubricant system passage 106. Over time, the amount of debris 120 trapped by the debris filter media 118 may become so large as to restrict flow through the debris filter media 118 by an undesirable amount. It is desirable to eliminate the need to clean or replace the debris filter media 118, or to at least limit the frequency with which the debris filter media 118 must be cleaned or replaced. This may be accomplished by flushing the debris 120 from the debris filter media 118 into the main lubricant system passage 104 where it may be trapped by the main lubricant system filter. The debris filter media 118 may be flushed by placing the valve 112 into the second position shown in FIG. 3.

When the valve 112 is in the second position as shown in FIG. 3, lubricant 102 flowing from the auxiliary lubricant supply passage 108 is prevented from flowing to the auxiliary lubricant system passage 106 and instead flows to the main lubricant system passage 104. Lubricant flowing from the auxiliary lubricant supply passage 108 passes across the surface of debris filter media 118, and scrubs some or all of the debris particles 120 trapped on the surface of the debris filter media 118 so that they flow to the main lubricant system passage 104 and are filtered by the main lubricant system filter. In this manner, the debris filter media 118 is self-flushing whenever the valve 112 is placed in the second position. The valve 112 may be placed in the second position often enough as part of the normal operation of the lubricant system 100 to keep the debris filter media 118 clean, or the lubricant system 100 may be designed to periodically move the valve 112 to the second position for the purpose of cleaning the debris filter media 118. In this way, the debris filter media 118 does not need to be serviced by maintenance personnel.

Figure 4:
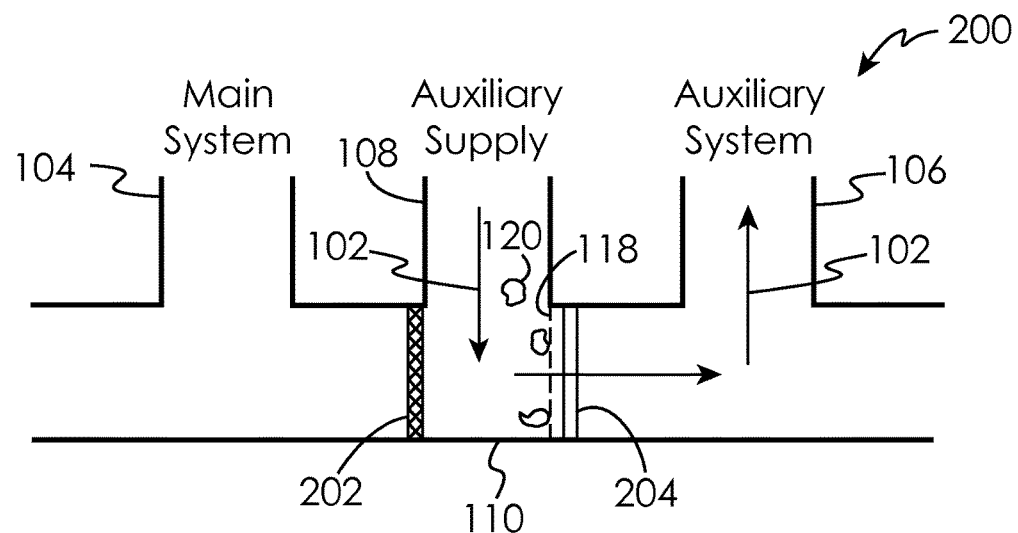
FIG. 4 is a schematic diagram of a fluid flow system in an embodiment.
Figure 5:
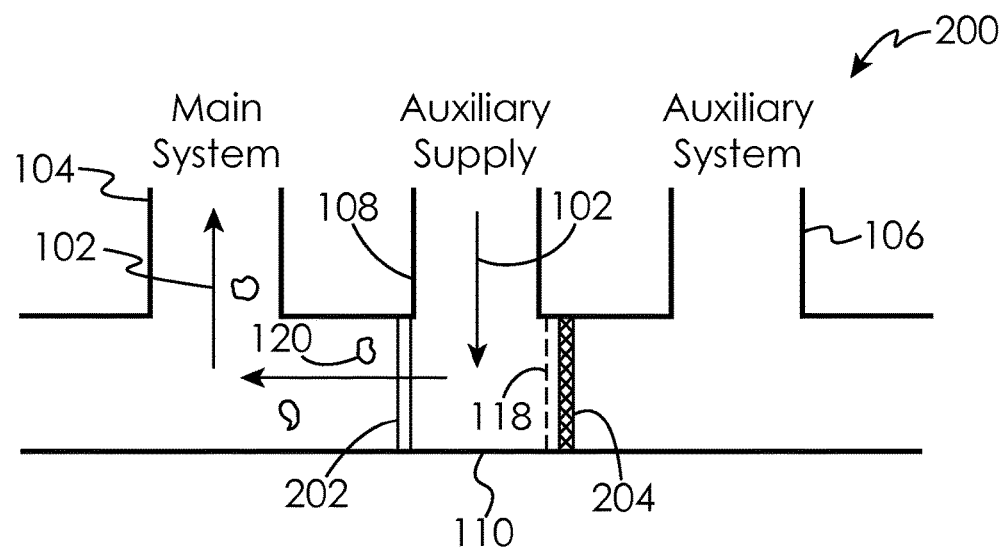
FIG. 5 is a schematic diagram of a fluid flow system in an embodiment.

In another embodiment, fluid flow system, such as a lubricant system, is illustrated in FIGS. 4-5 and indicated generally at 200. The lubricant system 200 is substantially identical to the lubricant system 100, except that the single valve 112 is replaced with two valves 202 and 204 that are operated in unison. The valves 202 and 204 may comprise pressure controlled valves, solenoid controlled valves or a combination of valve types to provide the described flow directions to name just a few non-limiting examples. In a first position, shown in FIG. 4, the valve 204 is open and the valve 202 is closed, such that lubricant 102 flowing from the auxiliary lubricant supply passage 108 to the auxiliary lubricant system passage 106 passes through the debris filter media 118, and some or all of the debris particles 120 contained in the lubricant 102 are trapped by the debris filter media 118 so that they do not flow to the auxiliary lubricant system passage 106. The debris filter media 118 may be flushed by placing the valves 202 and 204 into the second position shown in FIG. 5.

In the second position shown in FIG. 5, the valve 202 is open and the valve 204 is closed, such that lubricant 102 flowing from the auxiliary lubricant supply passage 108 is prevented from flowing to the auxiliary lubricant system passage 106 and instead flows to the main lubricant system passage 104. Lubricant flowing from the auxiliary lubricant supply passage 108 passes across the surface of debris filter media 118, and scrubs some or all of the debris particles 120 trapped on the surface of the debris filter media 118 so that they flow to the main lubricant system passage 104 and are filtered by the main lubricant system filter. In this manner, the debris filter media 118 is self-flushing whenever the valves 202 and 204 are placed in the second position. The valves 202 and 204 may be placed in the second position often enough as part of the normal operation of the lubricant system 200 to keep the debris filter media 118 clean, or the lubricant system 200 may be designed to periodically move the valves 202 and 204 to the second position for the purpose of cleaning the debris filter media 118. In this way, the debris filter media 118 does not need to be serviced by maintenance personnel.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A fluid flow system, comprising:
a main fluid system passage;
an auxiliary fluid supply passage;
an auxiliary fluid system passage;
a valve passage operatively fluidically coupling the main fluid system passage, the auxiliary fluid supply passage, and the auxiliary fluid system passage; and
a valve disposed in the valve passage, wherein the valve is operable to be placed into:
 a first position in which a fluid flowing in the auxiliary fluid supply passage is not permitted to flow to the main fluid system passage and is permitted to flow to the auxiliary fluid system passage;
 a second position in which the fluid flowing in the auxiliary fluid supply passage is permitted to flow to the main fluid system passage and is not permitted to flow to the auxiliary fluid system passage; and
wherein the valve passage is coupled to a debris filter media disposed within the valve passage between the auxiliary fluid supply passage and the auxiliary fluid system passage; the debris filter media configured to collect debris in the fluid flowing from the auxiliary fluid supply passage when the valve is in the first position, and configured to flush the debris into the main fluid system passage when the valve is in the second position.

2. The fluid flow system of claim 1, wherein the fluid flow system comprises a lubricant system.

3. The fluid flow system of claim 2, wherein the lubricant system is for a gas turbine engine.

4. The fluid flow system of claim 2, wherein the fluid flowing in the auxiliary fluid supply passage comprises oil.

5. The fluid flow system of claim 1, wherein the valve comprises a shuttle valve.

6. The fluid flow system of claim 1, wherein the valve comprises:
a first valve disposed between the debris filter media and the auxiliary fluid system passage; and
a second valve disposed between the auxiliary fluid supply passage and the main fluid system passage.

7. The fluid flow system of claim 6, wherein the first valve and the second valve each comprise a valve selected from a group consisting of: a pressure controlled valve and a solenoid controlled valve.

8. The fluid flow system of claim 1, wherein the debris filter media comprises a screen material.

9. A gas turbine engine, comprising:
a compressor section, a combustor section, and a turbine section in serial flow communication; and
a lubricant system operative to supply lubricant to at least one of the compressor section, the combustor section, and the turbine section, the lubricant system comprising:
a main lubricant system passage;
an auxiliary lubricant supply passage;
an auxiliary lubricant system passage;
a valve passage operatively fluidically coupling the main lubricant system passage, the auxiliary lubricant supply passage, and the auxiliary lubricant system passage; and
a valve disposed in the valve passage, wherein the valve is operable to be placed into:
 a first position in which the lubricant flowing in the auxiliary lubricant supply passage is not permitted to flow to the main lubricant system passage and is permitted to flow to the auxiliary lubricant system passage;
 a second position in which the lubricant flowing in the auxiliary lubricant supply passage is permitted to flow to the main lubricant system passage and is not permitted to flow to the auxiliary lubricant system passage; and
wherein the valve passage is coupled to a debris filter media disposed within the valve passage between the auxiliary lubricant supply passage and the auxiliary lubricant system passage; the debris filter media configured to collect debris in the lubricant flowing from the auxiliary lubricant supply passage when the valve is in the first position, and configured to flush the debris into the main lubricant system passage when the valve is in the second position.

10. The gas turbine engine of claim 9, wherein the lubricant flowing in the auxiliary lubricant supply passage comprises oil.

11. The gas turbine engine of claim 9, wherein the valve comprises a shuttle valve.

12. The gas turbine engine of claim 9, wherein the valve comprises:
a first valve disposed between the debris filter media and the auxiliary lubricant system passage; and
a second valve disposed between the auxiliary lubricant supply passage and the main lubricant system passage.

13. The fluid flow system of claim 6, wherein the first valve and the second valve each comprise a valve selected from a group consisting of: a pressure controlled valve and a solenoid controlled valve.

14. The gas turbine engine of claim 9, wherein the debris filter media comprises a screen material.

* * * * *